Aug. 14, 1962    R. W. PETERS    3,049,366
TRAILER HITCH
Filed March 22, 1960    2 Sheets-Sheet 1
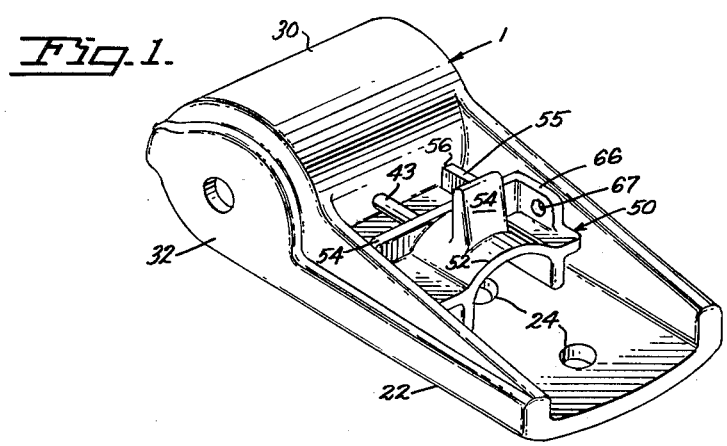
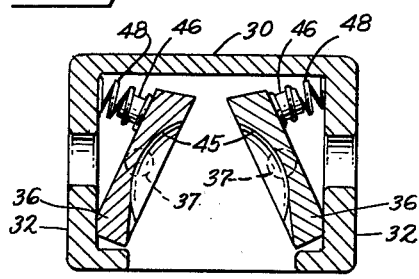
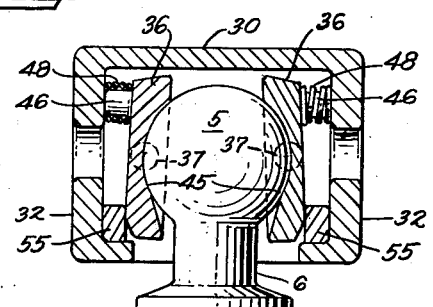
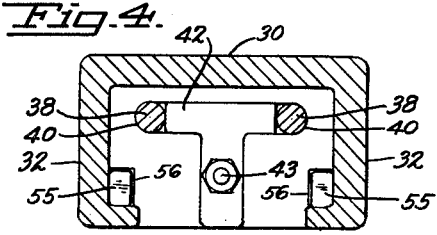
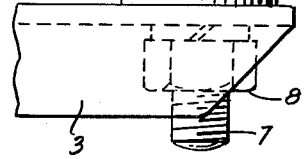
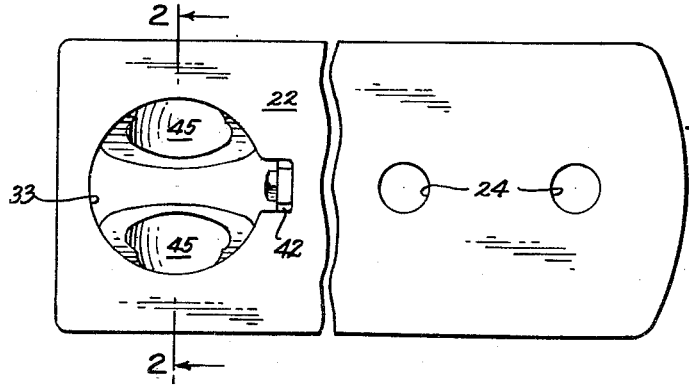
INVENTOR.
RUDOLPH W. PETERS
BY
ATTORNEY.

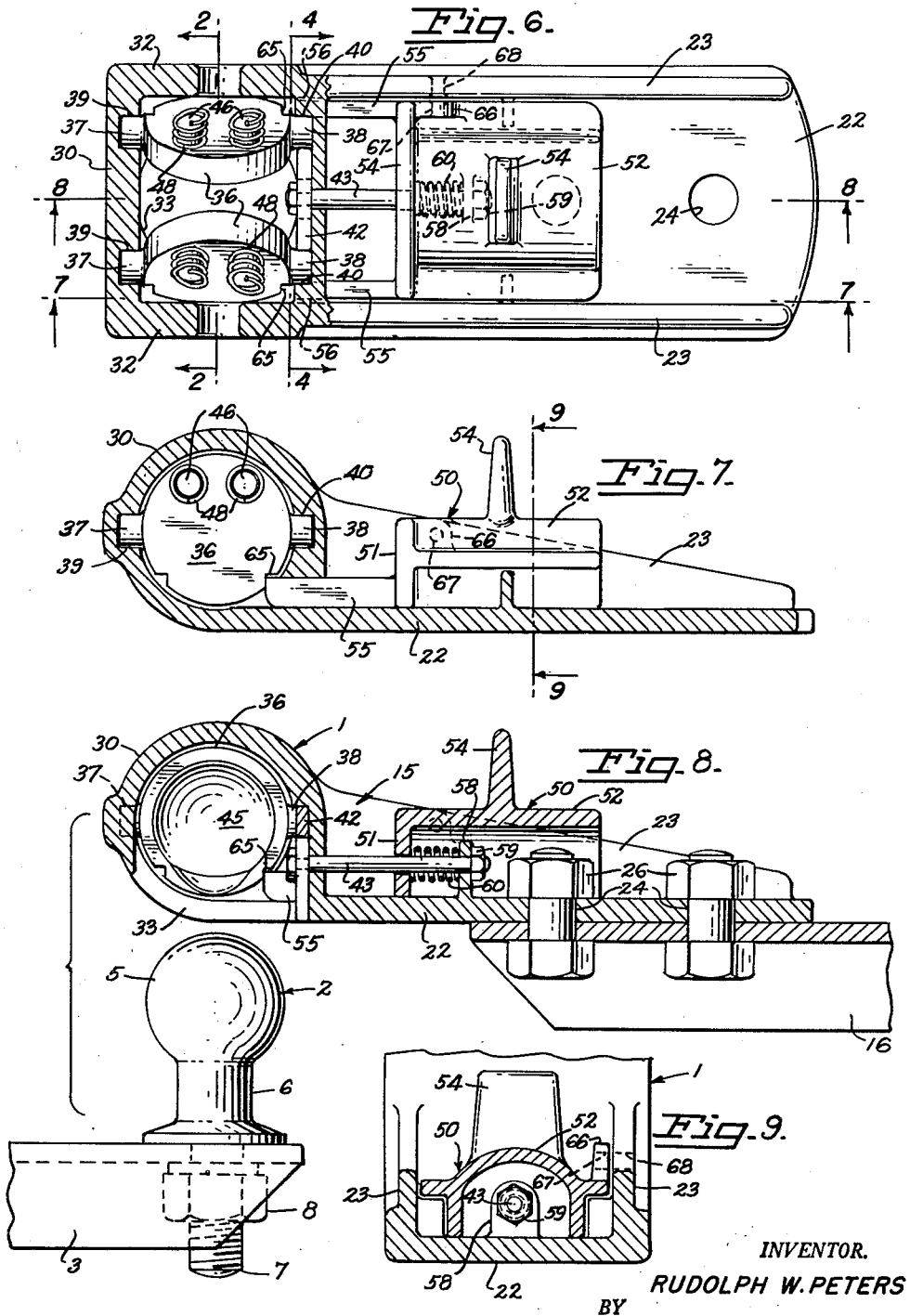

3,049,366
TRAILER HITCH
Rudolph W. Peters, 1724 Market St., Oakland, Calif.
Filed Mar. 22, 1960, Ser. No. 16,701
2 Claims. (Cl. 280—512)

This invention relates to a trailer hitch.

The primary object of this invention is to provide an improved hitch for a trailer by which the latter is quickly attached and detached to an automobile.

Another object of this invention is to provide a hitch consisting of a king pin and a socket coupling in which the head of the king pin is automatically locked in the socket when inserted in the latter, and is manually unlocked.

Other objects and advantages will appear as the specification proceeds and the novel features of the device will be particularly pointed out in the claims hereto annexed.

In this specification and the annexed drawings, the invention is illustrated in the form considered to be the best, but it is understood that the invention is not limited to such form; and it is also to be understood that in and by the claims following the description, it is desired to cover the invention in whatsoever form it may be embodied.

This invention is illustrated in the drawings forming a part of this specification, in which:

FIG. 1 is a perspective view of the coupling.

FIG. 2 is a vertical cross-section of the coupling taken along the line 2—2 of FIG. 5.

FIG. 3 is a vertical cross-section through the trailer hitch showing the king pin in elevation.

FIG. 4 is a vertical cross-section of the coupling taken along the line 4—4 of FIG. 6.

FIG. 5 is a bottom view of the coupling.

FIG. 6 is a horizontal cross-section of the coupling taken along the line 6—6 of FIG. 7.

FIG. 7 is a vertical cross-section of the coupling taken along the line 7—7 of FIG. 6, some parts being shown in elevation.

FIG. 8 is a vertical cross-section through the coupling taken along the line 8—8 of FIG. 6 and showing the king pin in elevation before the same are connected, and FIG. 9 is a vertical cross-section through the coupling taken along the line 9—9 of FIG. 7.

My trailer hitch consists of two parts: a coupling device 1 and a king pin 2.

The latter is preferably secured to an automobile by a draw bar 3, and comprises a spherical head 5 provided with a flanged stem 6 from which a threaded stud 7 extends downwardly through a suitable hole in the bar 3. The stud is fixedly secured to said bar by a nut 8.

The coupling device 1 includes a housing 15 which is adapted to be secured to a draw bar 16 preferably carried by a trailer or the like. The housing 15 consists of a yoke portion 22 having side flanges 23 and provided with holes 24 through which bolts 25 pass connecting said housing with the draw bar 16, said bolts being retained by nuts 26.

The other end of the housing is formed into a hollow cylinder 30, the longitudinal central axis of which is perpendicular to the same of the yoke. The sides of said cylinder are closed by walls 32. The lower part of said cylinder is formed with a substantially round opening 33 through which the head 5 is adapted to pass.

The cylinder 30 contains a pair of round disks 36, each pivotally retained therein by a pair of pivots 37 and 38 provided diametrically opposite to each other on the round edge of said disk. The pivot 37 rests in a round depression 39 in the front of the cylinder substantially in the central horizontal plane of the cylinder and in the near vicinity of said side and the pivot 38 rests in a groove 40, wherein said pivot is locked by a cross bar 42 connected to said cylinder by a bolt 43 and abutting the pivots 38, as shown in FIG. 4.

The disk 36 is introduced into the cylinder 30 through the opening 33, and is moved into a position wherein the pivot 37 enters the depression 39, while the pivot 38 is placed in the groove 40. Then the second disk is placed inside of said cylinder the same way and both disks are locked in place by the cross bar 42. The disks 36 are free to swing on said pivots.

The sides of the disks 36 facing each other in said cylinder are formed with spherical depressions 45, while the other sides carry abutments 46. The upper parts of the disks 36 are urged toward each other by springs 48, thus forcing the lower parts of said disks wide apart, so that the lowermost portions of the outer sides contact the side walls 32, as shown in FIG. 2.

A slide 50 is arranged on the yoke portion 22. Said slide consists of a vertical front plate 51 extending from one flange 23 to another, a rounded top 52 extending therefrom backwardly and two sides 53 extending from the top to the yoke in spaced relation to the flanges 23. The slide 50 can be manually moved backwardly by means of a handle 54 provided on the top 52.

The slide 50 carries a pair of locking bars 55 secured to the front plate 51 and extending from the lower outer edges thereof forwardly parallel to the flanges 23. The locking bars pass the openings 56 in the cylinder 30 and extend thereinto.

The bolt 43, connecting the cross bar 42 to the cylinder 30, extends beyond the latter, passes through the front plate 51 and through a lip 58 raising vertically from the yoke portion 22 and is retained by a nut 59. A spring 60 is provided between said front plate 51 and the lip 58 which pushes the slide toward the cylinder 30.

The disks 36 normally are at an angle to each other and opened in direction to the opening 33, which position is shown in FIG. 2. At this time the slide 50 is retracted, as shown in FIG. 8. The spring 60 urges the slide 50 forwardly, but its forward motion is stopped by the locking bars 55, the ends of which abut the disks 36 in the notches 65 on the periphery thereof. When the head 5 is introduced into the cylinder 30 through the opening 33, it strikes the upper portions of the disks 36 forcing them to swing into a position wherein they are substantially parallel to each other, thus locking the head and disengaging the locking bars 55. Thereupon, the spring 60 moves the slide 50 and said locking bars 55 forwardly between the lower portions of said disks and the side walls 32, thus locking the disks 36 and the head 5 therebetween, as shown in FIG. 3.

The head 5 remains securely locked between the disks 36 until the slide 50 is manually moved backwardly, whereupon the disk springs 48 push the upper portions of said disks inwardly, thus swinging the disks into its normal angular position, shown in FIG. 2, and releasing the head.

If desired, a lug 66 with a hole 67 may be provided on the slide 50 and a matching hole 68 may be drilled in the flange 23 for a lock to lock said slide to the flange when the slide is in its most forward position.

I claim:

1. A hitch comprising a king pin secured to a draw bar and including a spherical head connected to the draw bar by a flanged stem; and a coupling device including a housing in form of a closed hollow cylinder with closed ends, a pair of concave disks for locking the head therebetween, each disk being arranged at the end of the cylinder, and pivotally connected thereto by a pair of substantially horizontal pivots, said cylinder having an opening in its wall between said disks for introducing the head into said cylinder; spring means for urging said disks in angular positions for admitting said head therebetween;

a yoke integral with said cylinder; disk locking means consisting of a slide arranged on said yoke, a pair of disk locking bars extending from the opposite sides of said slide into the cylinder and abutting said disks when the same are in the angular positions, and spring means for pressing said locking bars against said disks, and for pushing said bars between said disks and the ends of the cylinder when the head, upon entering the cylinder, swings the disks into a substantially parallel position.

2. A hitch comprising a king pin secured to a draw bar and including a spherical head connected to the draw bar by a flanged stem; and a coupling device including a housing in form of a closed hollow cylinder, having end walls, a pair of concave disks for locking the head therebetween, each disk being arranged in said cylinder in close proximity to the respective end wall and connected to said cylinder by a pair of substantially horizontal pivots, said cylinder having an opening in its lower side between said disks for introducing the head into said cylinder, spring means connected to said disks for swinging the disks in angular positions with the upper edges of said disks being in close proximity to each other; a yoke integral with said cylinder, a pair of locking bars slidable on said yoke and protruding into said cylinder at their end walls to abut the disks when the same are in the angular positions, spring means for pressing said bars between the disks and the end walls of the cylinder, when the head upon entering the cylinder swings the disks into substantially parallel positions.

References Cited in the file of this patent
UNITED STATES PATENTS

| | | |
|---|---|---|
| 2,061,234 | Hoflich | Nov. 17, 1936 |
| 2,407,464 | Wilson | Sept. 10, 1946 |
| 2,475,878 | Clark et al. | July 12, 1949 |
| 2,874,976 | Linn | Feb. 24, 1959 |

FOREIGN PATENTS

| | | |
|---|---|---|
| 10,326 | Germany | Aug. 16, 1956 |